United States Patent [19]

Schaffer

[11] Patent Number: 4,734,247
[45] Date of Patent: Mar. 29, 1988

[54] HELICAL SHAPING METHOD AND APPARATUS TO PRODUCE LARGE TRANSLATIONAL TRANSFORM IN PINCH PLASMA MAGNETIC CONFINEMENT

[75] Inventor: Michael J. Schaffer, San Diego, Calif.

[73] Assignee: GA Technologies Inc., San Diego, Calif.

[21] Appl. No.: 770,314

[22] Filed: Aug. 28, 1985

[51] Int. Cl.$^4$ .............................................. G21B 1/00
[52] U.S. Cl. .................................................. 376/133
[58] Field of Search ................. 376/121, 133, 139, 150

[56] References Cited

U.S. PATENT DOCUMENTS 3,278,384 10/1966 Lenard et al. ...................... 376/133
4,302,284 11/1981 Ohkawa .............................. 376/133
4,560,528 12/1985 Ohkawa .............................. 376/121

OTHER PUBLICATIONS

Yoshikawa, S., "Design of a Helical-Axis Stellarator," *Nuclear Fusion*, vol. 23, No. 5, pp. 667-669 (1983).
Takeuchi, N., Y. Kondoh, T. Shimada and K. Sugita, "Equilibrium Configuration of Reversed Field Pinch with a Helical Magnetic Axis," *Nuclear Fusion* 24, pp. 1495-1500 (1984).
Furth; H. P., J. Killeen, M. N. Rosenbluth and B. Coppi, "Stabilization by Shear and Negative V"", *Plasma Physics and Controlled Nuclear Fusion Research* 1965, vol. 1, IAEA, Vienna, 1966, pp. 103-126.
Taylor, H. P., J. B., "Relaxtion of Toroidal Plasma and Generation of Reverse Magnetic Fields," *Physical Review Letters*, vol. 33, No. 19, pp. 1139-1141, Nov. 4, 1974.
Bodin, H. A. B., and A. A. Newton, "Reversed-Field Pinch Research," *Nuclear Fusion*, vol. 20, No. 10, pp. 1255-1323 (1980).
Boozer, A. H., T. K. Chu, R. L. Dewar, H. P. Furth, J. A. Goree, J. L. Johnson, R. M. Kulsrud, D. A. Monticello, G. Kuo-Petravic, G. V. Sheffield, S. Yoshikawa, and O. Betancourt, "Two High-Beta Toroidal Configurations: A Stellarator and a Toramak-Torsatron Hybrid," Paper IAEA-CN-41/Q-4, 9th International *Conference on Plasma Physics and Controlled Nuclear Fusion Research*, Baltimore, Sep. 1-8, 1982.
Yoshikawa, Shoichi, "Heliac Configurations," 9th International Conference on *Plasma Physics and Controlled Nuclear Fusion*, Sep. 7, 1982.

*Primary Examiner*—Deborah L. Kyle
*Assistant Examiner*—Richard L. Klein
*Attorney, Agent, or Firm*—Fitch, Even, Tabin & Flannery

[57] ABSTRACT

A magnetically confined helical z-pinch plasma is formed as a helicoid having an approximately D-shaped cross section, thereby generating a large transform of magnetic field line pitch suitably distributed throughout the plasma volume to aid in the reversal of field lines in the axial direction and increase magnetic shear.

1 Claim, 11 Drawing Figures

$\alpha r_0 = 1$
$r_{ax} = \frac{2}{3} r_0$

HELICAL SHAPING METHOD AND APPARATUS TO PRODUCE LARGE TRANSLATIONAL TRANSFORM IN PINCH PLASMA MAGNETIC CONFINEMENT

BACKGROUND OF THE INVENTION

This invention relates generally to plasma devices and particularly to the confinement and stabilization of plasmas in fusion devices of the reversed field pinch (RFP) and related classes, the confining magnetic fields of which are generated primarily by axially directed electric current and which are stabilized principally by reversal of the magnetic field line pitch and by magnetic shear. More particularly, the present invention relates to the generation of a large translational transform by shaping of the plasma cross section as a means of aiding pitch reversal and increasing magnetic shear. The invention is operative with both open ended, topologically linear plasmas, and with closed, topologically toroidal plasmas. A topological torus is any geometric solid figure that can be produced by an imagined elastic deformation of an initial circular torus.

The problems in nuclear fusion devices are largely to heat the plasma to a high enough temperature to enable the desired reactions to occur and to confine the heated plasma for a time long enough to release energy in excess of that required to heat the plasma to reaction temperature. The present invention is directed to the magnetic confinement of such plasma and finds particular utility in such devices and their applications, including experimental devices and the use thereof in experimentation and investigation with respect to plasma devices. Toroidal plasma devices are the most effective in the confinement of the high temperature plasmas of fusion interest. Toroidal plasma devices are devices in which plasma is created in a topologically toroidal space and is confined therein by appropriate magnetic fields.

The magnetohydrodynamic (MHD) stability of a magnetically confined plasma is dependent on the pitch of the magnetic field lines encircling a magnetic axis. This pitch P is defined by $$P = \lim_{k \to \infty} \frac{\Delta \zeta}{2\pi k}, \tag{1}$$

where $\Delta \zeta$ is the distance a field line advances along the direction of the magnetic axis and k the number of times the axis is encircled. This limit is the same for all possible field lines on a given magnetic surface. A magnetic surface is defined as a mathematical surface on which the magnetic field has no component normal thereto. The magnetic surface enclosing zero volume in the center of nested magnetic surfaces is called an elliptic magnetic axis, or simply the magnetic axis when there is no other kind of magnetic axis. The magnetic shear s can be defined and is defined herein, as $$s = \frac{dP}{d\bar{r}}, \tag{2}$$

where $\bar{r}$ is any convenient monotonic variable (for example, an average radius) that labels the distance of the magnetic surfaces from the magnetic axis. Some minimal conditions of MHD stability are:

1. $s \neq 0$, except at the magnetic axis.

2. $|q| \neq 1$, q being the so-called safety factor defined by $q \equiv 2\pi P/L$, where L is the length of the magnetic axis, i.e., in the case of a toroidal configuration, the length around the torus along the magnetic axis, and in the case of a linear configuration, the length from end to end along the magnetic axis.

3. $|s|$ is sufficiently large to satisfy the Mercier criterion. C. Mercier, "Critére de Stabilité d'an Systeme Toroidal Hydromagnétique en Pression Scalaire," Nuclear Fusion Supp., Part 2, pp. 801–808 (1962).

A pinch effect takes place when large electric current flowing through the plasma is acted upon by its own magnetic field to exert a confining pressure on the plasma. The large current simultaneously heats the plasma ohmically. The simplest pinch configuration, called the Bennett pinch, is unstable, and most of the plasma soon strikes the confinement vessel, hence cooling the plasma and impeding any reaction. Therefore, the simple pinch must be modified to improve its stability. The most successful pinch for magnetic confinement of plasmas to date has been the reversed field pinch.

A review of the RFP art was given by H. A. B. Bodin and A. A. Newton, "Reversed-Field-Pinch Research," Nucl. Fusion 20, pp. 1255–1324 (1980). The RFP is a diffuse z-pinch of circular cross section in which the magnetic field component sensibly parallel to the magnetic axis has a direction in the outside region of the plasma opposite to that in the inner region, and as a result, P(r) passes through zero and changes sign within the plasma, where r is the minor radius measured from the magnetic axis. As discussed in the Bodin and Newton publication in conjunction with FIG. 7 thereof, the reversal of P within the plasma is necessary to ensure monotonicity of P through the transition region between the plasma and the surrounding vacuum. In actual experiments with conventional RFPs, the level of instability is notably reduced once the reversed pitch profile is established. Because of increasingly successful experiments, the reversed field pinch principle is of growing interest for the achievement of fusion energy. However, stabilization is not complete in the RFP, and this may be the cause of reduced plasma confinement when compared with other confinement devices, such as tokamaks. It is commonly accepted that the azimuthal plasma current needed to maintain the desired reversed axial magnetic field, which current cannot be sustained by means external to the plasma, is driven by an as yet unidentified "plasma dynamo" mechanism linked to low level plasma instability.

A more global theory of the stability of the RFP and related pinch plasmas was advanced in J. B. Taylor, "Relaxation of Toroidal Plasma and Generation of Reverse Magnetic Fields," *Physical Review Letters* 33, pp. 1139–1141 (1974), which showed that the minimum energy, and hence most stable, state accessible to a plasma that conserves global magnetic helicity must obey the equation $$\nabla \times \vec{B} = \mu \vec{B}, \tag{3}$$

where $\vec{B}$ is the magnetic flux density or field and $\mu$ is a constant. Equation 3 describes a Taylor state plasma. It can also be written as $$\mu_0 \vec{J} = \mu \vec{B}, \tag{4}$$

where $\vec{j}$ is the electric current density and $\mu_o$ is the magnetic permeability of free space. Actual RFP plasma fields approximate Equations (3) and (4) rather well. The principal discrepancy is that $\mu$ is not a constant but drops to zero or a small value near the edge of the plasma which reduces the magnetic shear and plasma stability there. However, it is known from detailed results of conventional MHD stability theory that a gradient in $\mu$ is a destabilizing factor. Because plasma near the edge is cold and poorly conducting, a reduction in $\vec{j}$, and hence the gradient in $\mu$ near the edge, appears inevitable. It would be desirable to augment the magnetic shear in this region to reduce, and perhaps overcome, the destabilizing effect. It would also be desirable to reduce the magnitude of the azimuthal current in the plasma needed to maintain a pitch-reversed configuration. This is desirable because azimuthal current is driven by the plasma dynamo, which depends upon turbulence in the plasma, but turbulence leads to loss of plasma, and because the plasma dynamo effect is self-regulating, whereby by requiring less plasma dynamo for producing azimuthal current there is less plasma loss. According to the present invention, increased magnetic shear and decreased azimuthal current may be achieved by adding a large translational transform to augment the pitch reversal.

Translational transform is shown by T. Ohkawa, U.S. Pat. No. 4,302,284. It consists of changing the direction of an otherwise azimuthally directed magnetic field (around the magnetic axis), such as predominates in z-pinches, to have a mean axial component (in the direction of the magnetic axis) as well, by giving the plasma a helically symmetric shape by means of external electrical conductors. The Ohkawa device utilizes multipolar helical windings for this purpose. However, the practical amount of change obtainable by this method, which relies on proximity of the plasma to a magnetic separatrix, appears to be inherently limited to less than about 10°, and the transform is localized near the separatrix. It is an aspect of the present invention to produce a much larger translational transform for an RFP-like plasma.

SUMMARY OF THE INVENTION

The present invention involves a method and apparatus for shaping an RFP plasma to obtain a large translational transform. The method is to bend the pinch plasma into a helicoid about a guiding axis (circular toroidal minor axis if a toroidal system, straight axis if a linear system) and simultaneously to flatten, or even indent slightly, the side of the plasma closest to the guiding axis, as viewed in a cross section through the plasma in a plane perpendicular to the guiding axis. The plasma magnetic axis is helical preferably with a radius approximately equal to half the transverse dimension of the plasma. The specified shaping, in combination with the magnetic fields it produces, generates a large transform of magnetic field lines in the axial direction. This transform arises from the geometric shaping and not from proximity to a separatrix, and it will be demonstrated below that it is large and distributed throughout much of the plasma volume. Because of its approximately D-like cross section, the present invention can aptly be called a helical D-pinch.

The apparatus preferably contains many elements common to successful RFP experiments: a slightly conducting vacuum chamber with means for producing vacuum therein and filling it with the desired gas at appropriate pressure; a conducting shell close to the plasma, the shape of which in the present invention conforms to the special shape of the plasma; a set of coils encircling the chamber, analogous to toroidal field coils in the conventional RFP, to make an axial magnetic field within the chamber; an induction coil to induce an axial electrical current within the chamber (replaced by end electrodes in a linear embodiment); a vertical field coil to control the plasma major radius position; and instruments to measure and monitor plasma and system operation and performance. Pursuant to the invention the apparatus also contains a system of conductors to shape the plasma by currents running helically along the exterior of the plasma.

The device of the present invention is distinctly different from prior art reversed field pinches and z-pinches in that the pinched plasma is forced into a helicoid with an approximately D-like cross section, and in that part of the field line pitch reversal is generated by the shaping instead of by plasma currents alone. It is distinctly different from prior art helical pinches as in the system shown in T. Ohkawa, U.S. Pat. No. 4,302,284, sometimes referred to as OHTE, in that its magnetic axis is distinctly helical with a helical radius approximately the same as the plasma minor radius, and in that the change in magnetic field line pitch produced by the plasma shaping is not effected by proximity to a magnetic separatrix or separatrices (though such may also be present in certain embodiments of the present invention).

The device of the present invention is also distinctly different from the helical axis reversed field pinch recently proposed by K. Takeuchi, Y. Kondoh, T. Shimada and K. Sugita, "Equilibrium Configurations of Reversed Field Pinch with a Helical Magnetic Axis," Nuclear Fusion 24, pp. 1495–1500 (1984), in that the pinch of Takeuchi, et al. is not shaped and does not include shaping means to generate translational transform more optimally. (Equation (13) in the Takeuchi et al. paper and the results calculated from it are erroneous.)

The device of the present invention is also distinctly different from prior art helical axis stellarators, including those like Heliac having D-like plasma cross sections, which it superficially resembles. The Heliac configuration is shown in S. Yoshikawa, "Design of a Helical-Axis Stellarator," Nuclear Fusion, Vol. 23, No. 5, pp. 667–669 (1983). All stellarator devices employ substantially helical shaping of the plasma to generate a rotational (poloidal) transform of a strong axial magnetic field applied by external coil means. The present invention employs shaping to generate a translational (axial) transform of a poloidal (azimuthal) magnetic field produced by strong axial currents flowing through the plasma. Stellarator devices are seriously unstable unless $|q| \equiv 1$ whereas the present invention, like the RFP from which it is derived, has its stable operating regime for a range of $|q| << 1$. Consequently, stellarator devices require a large ratio of toroidal magnetic field to plasma current, and in fact they are most stable and confine plasma best when plasma currents are minimized. Therefore, stellarator devices include means for the application of large toroidal magnetic fields but only limited means, if any, to induce current in the plasma. Devices embodying the present invention, like reversed field pinch devices, include powerful means to induce large toroidal electric current in the plasma, but toroidal magnetic field means of only limited strength need be provided, but they must provide for reversal of the toroidal (axial) field direction during the process of plasma formation.

Thus, it is a primary aspect of the present invention to provide for magnetic pinch confinement of plasma with magnetic field line pitch reversal and magnetic shear aided and augmented by a translational transform produced geometrically by making the plasma a helicoid with an approximately D-shaped cross section in the planes perpendicular to the guiding axis. Other aspects, objects and advantages of the present invention will become evident from the consideration of the following detailed description, particularly when taken in conjunction with the accompanying drawings.

DETAILED DESCRIPTION OF THE INVENTION

Figure 1:
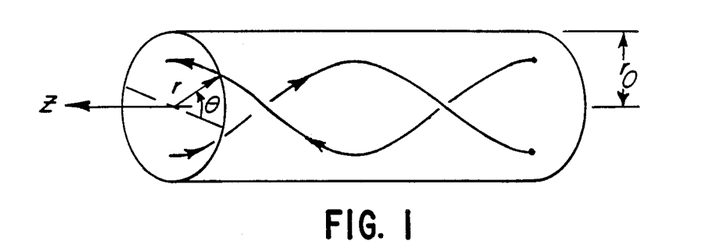
FIG. 1 is a diagrammatic illustration of two helical wires carrying equal and opposite electric currents inside a superconducting circular cylinder.
Figure 2:
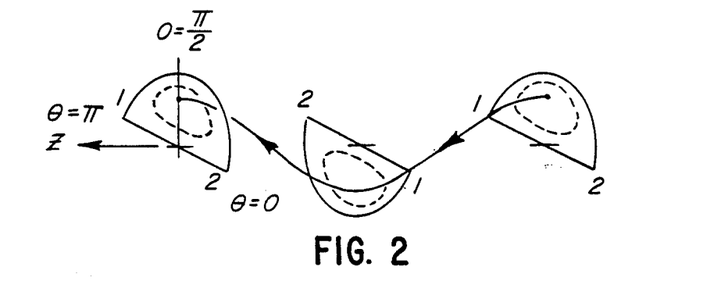
FIG. 2 is a diagrammatic illustration of a single current carrying helical wire inside a superconducting helicoid of semicircular cross section, equivalent to one half of the system of FIG. 1.

The helical D translational transform principle of the present invention can be explained by reference to an example, wherein a wire in a region surrounded by a D-shaped superconductor, as shown in FIG. 2 with a flat side 1—2, represents a helical z-pinch current channel. Such wire may be compared to one of a twisted pair of spaced thin helical wires carrying equal and opposite currents inside a concentric superconducting circular cylinder as shown in FIG. 1, where cylindrical coordinates (r, $\theta$, z) are also identified. The magnetic field in the arrangement shown in FIG. 2 is the same as in the helical D region shown in FIG. 1 surrounding just one of the wires. As is evident from the symmetry of the arrangement of FIG. 1, the magnetic field B at the flat side of the channel has no z-component and is purely radial. At the semicircular boundary, B has positive $B_\theta$ and negative $B_z$ components. Because of the latter, magnetic field lines at the inner surface of the tube go in the negative z-direction, i.e., there is a translational transform. The z-directed magnetic field components are introduced by the helical twisting. However, their net contribution to transform would nearly cancel were it not for the flattened side of the D cross section, which eliminates the positive z-component of $\vec{B}$. Thus, both the helical twisting and the D shape are important. Close to the wire, the field lines encircle it with vanishing transform. Transform varies smoothly between the above two limits at intermediate radii. In many plasma devices carrying axial plasma current, including tokamak, RFP and z-pinch devices, a current channel, consisting of a diffuse region of greater axial current relative to the remainder of the plasma, forms about the magnetic axis. The single wire of FIG. 2 may properly be considered representative of such a z-pinch current channel, and the translational transform produced thereby can properly be considered to approximate the transform produced by such helical z-pinch channel.

It is well known (see Bodin et al.) that toroidal effects exert negligible influence on the basic properties of z-pinches, other than to eliminate plasma loss to the ends, provided $|q| < < 1$. Therefore, the present invention can be explained and understood with a great simplification of the mathematics by consideration of only the straight guiding axis case. Any such linear helicoid can be described in terms of only two coordinate variables (r,v), where $v = \theta - \alpha z$ is the helical angle. $\alpha$ is the inverse of the pitch of the helicoid along the guiding axis and is a constant. It is convenient to introduce two helical unit vectors, $\hat{u} = h^{-1}(\alpha r \hat{\theta} + \hat{z})$ in the helically invariant direction (the direction of the wire), and $\hat{v} = h^{-1}(\hat{\theta} - \alpha r \hat{z})$ mutually perpendicular to $\hat{u}$ and $\hat{r}$. Here $\hat{r}$, $\hat{\theta}$, $\hat{z}$, and are the usual cylindrical unit vectors derived respectively from coordinates r, $\theta$, and z, and $h = (1 + \alpha^2 r^2)^{\frac{1}{2}}$.

Figure 3A:
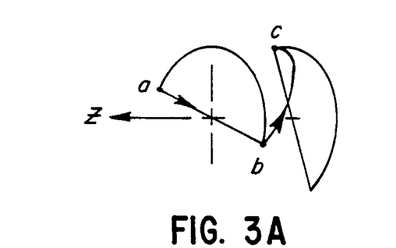
FIG. 3A is a diagrammatic illustration of the path taken by a magnetic field line at the inner surface of the helicoid shown in FIG. 2.
Figure 3B:
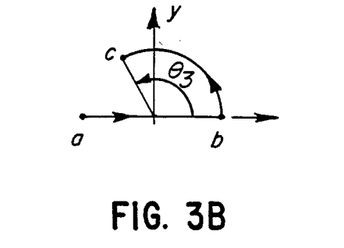
FIG. 3B is a diagrammatic illustration of the projection of the path abc into a transverse plane.

It can be readily demonstrated by Fourier decomposition of currents and magnetic fields that, for an arbitrary distribution of current that flows only in the $\hat{u}$ direction, the resultant magnetic field has no $\hat{u}$ component, that is, $\vec{B} = \hat{r} B_r + \hat{v} B_v$. Consider then the magnetic field line trajectory abc on a semicircular D helicoid surface, as illustrated in FIG. 3. Between points a and b $\vec{B} = \hat{r} B_r$ and there is no change in z. Between b and c the field line goes in the $\hat{v}$ direction at constant r, so $dz/r_0 d\theta = -\alpha r_0$ (where $r_0$ is the radius of the D boundary as shown in FIG. 1). The cycle is completed when the field line returns to the starting corner at c, which is expressed by $\theta_c = \pi + \alpha z_c$. Using $z_c = -\alpha r_0^2 \theta_c$, the result is $\theta_c = \pi/h_o^2$ and $z_c = -\pi \alpha r_0^2/h_o^2$, where $h_o = h(r_o)$ Then, per radian encirclement of the magnetic axis, the field line advances a distance $$P_{edge} = \frac{(1 + \alpha^2 r_{ax}^2)^{\frac{1}{2}} z_c}{\theta_c + \pi} = -\frac{\alpha r_0^2 (1 + \alpha^2 r_{ax}^2)^{\frac{1}{2}}}{2 + \alpha^2 r_0^2}, \quad (5)$$

where $r_{ax}$ is the radius of the magnetic axis measured from the guiding axis. Because there are no nonaxial (non-$\hat{u}$) currents in this example, this pitch is entirely of transform origin, and it is large. For example, if $\alpha r_0 = 1$ and $r_{ax}/r_0 = \frac{2}{3}$, then $P_{edge} = -0.40 r_o$.

Figure 4:
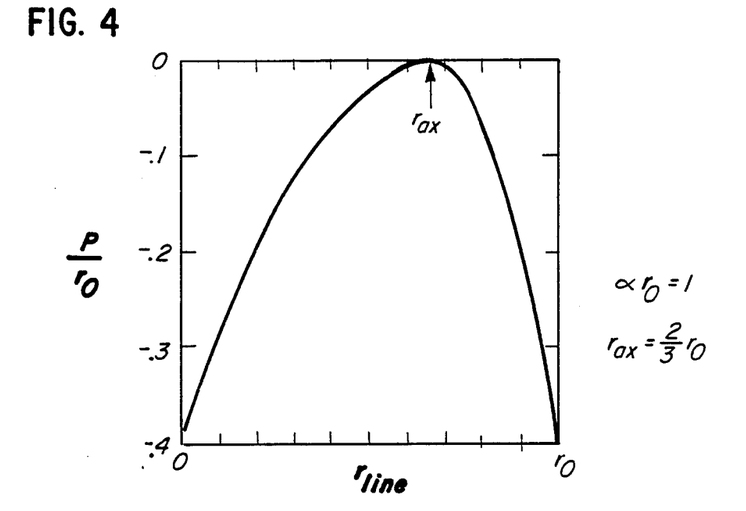
FIG. 4 is a curve of the computed pitch of the translational transform in a simple model of a diffuse pinch current in a semicircular helicoid.

Translational transform at other points in the plasma volume can be calculated approximately from a shell-current model of the plasma. Cylindrical $\hat{u}$-directed shell currents $\vec{j} = \delta(r) j_u \hat{u} \sin(\theta - \alpha z)$ are placed at $r_o$ and at $r = r_{ax} < r_o$, where $j_u$ is the intensity of the shell current and $\delta(r)$ is the delta function. The resulting vacuum magnetic fields can be written analytically. By providing the strength of the shell current at $r_o$ to make $B_r(r_o)=0$, a helical D configuration is created. The second sinusoidal current shell at $r=r_{ax}$ approximates a diffuse plasma current channel centered about a magnetic axis at that radius. In FIG. 4 is plotted the pitch of the magnetic field lines as a function of position in the plasma for the shell current model when $r_{ax}=2r_o/3$ and $\alpha r_o=1$. In FIG. 4 magnetic field lines are identified by $r_{line}$, the radius the line has when it crosses $\theta - \alpha z = \pi/2$. Similar distributions are obtained for other values of $r_{ax}/r_o$. It is noteworthy that the transform pitch is large everywhere within the "plasma" except near the magnetic axis at $r_{ax}$. It is not concentrated near the edges (at 0 and $r_o$) as when transform is produced by a separatrix. Because the helical D transform distribution is close in form to the pitch of a circular RFP Taylor state, it may effectively supplant part of the plasma self reversal requirement. Another point worthy of note is that the present transform direction is opposite to that made by a separatrix, underscoring the fact that the present invention makes use of a fundamentally different phenomenon than the Ohkawa system.

A limited set of force-free constant-$\mu$ straight helical D pinch Taylor state MHD equilibrium configurations can be solved analytically from the helically symmetric Grad-Shafranov equation written in cylindrical coordinates, $$LF + \frac{2\alpha f}{h^4} + \frac{ff'}{h^2} + \mu_o p' = 0, \quad (6)$$

where $$L = \frac{1}{r} \frac{\partial}{\partial r}\left(\frac{r}{h^2} \frac{\partial}{\partial r}\right) + \frac{\partial^2}{r^2 \partial v^2}. \quad (7)$$

Here F is the helical flux function and the prime means d/dF. The function f(F) specifies $B_u$, the magnetic field in the invariant $\hat{u}$ direction, and p(F) is the plasma pressure. The magnetic field components are:

$$B_u = \frac{f}{h}, \quad B_v = \frac{\partial F}{h\partial r}, \quad B_r = -\frac{\partial F}{r\partial v}. \quad (8)$$

Plasma current density can be written as $$\vec{j} = -\frac{f\vec{B}}{\mu_o} - p'h u. \quad (9)$$

In force free plasmas, the pressure gradient is negligibly small, i.e., $p'=0$. Because from Ampere's law $\vec{j} = \nabla \times B/\mu_o$, it can be seen from Equations (3) and (9) that $f' = -\mu$. The set of harmonic solutions to Equation 6 that are finite at r=0 is $$F_m = (v_m a)^{-m}[\mu j_m(v_m r) - \alpha v_m r J_m'(v_m r)]e^{imv}, \quad (10)$$

$$f_m = -\mu F, \quad (11)$$

where m is any positive integer, $v_m = |\mu^2 - m^2\alpha^2|^{\frac{1}{2}}$, $J_m$ is the mth Bessel function, $J_m'(x)=(d/dx)J_m(x)$ and a is a radial scale length. (When $m^2\alpha^2 < \mu^2$, the $J_m$ are replaced by $I_m$ modified Bessel functions.) The m=1 solutions with r between zero and the first root of $F_1(v_1 r)$ describe semicircular helical D pinches. Because F=0 at the D boundary, f and hence $B_u$, are also zero there. Thus, this class of solutions is analogous to the conventional straight circular z-pinch with zero toroidal field at the edge.

Figure 5:
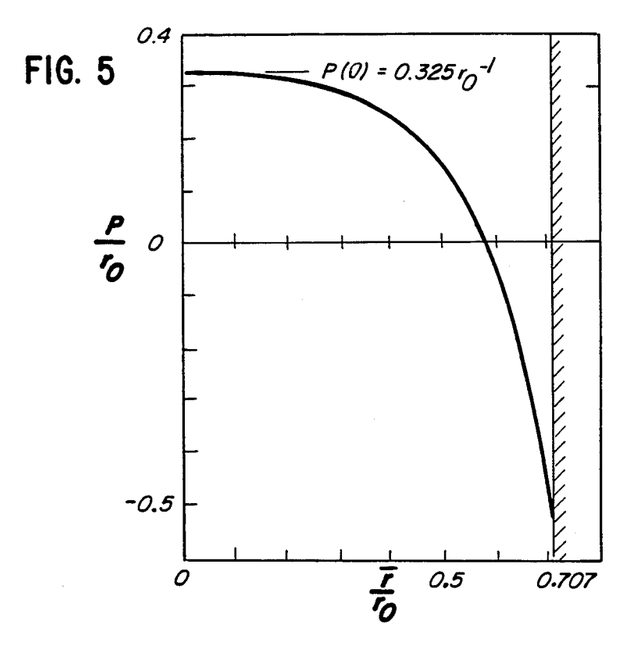
FIG. 5 is a curve showing the computed total pitch of a Taylor state plasma in a semicircular helicoid.
Figure 6:
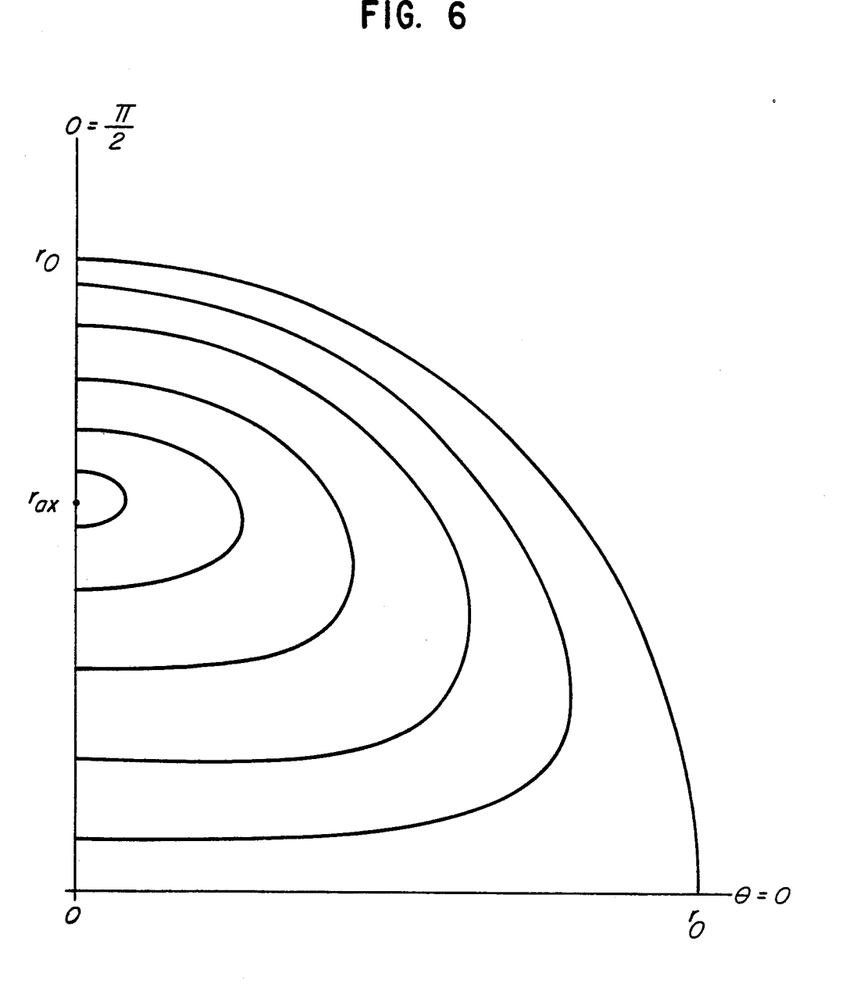
FIG. 6 is a plot showing selected magnetic surfaces in the same Taylor state plasma.

Equations (8), (10) and (11) were used to calculate the semicircular helical D Taylor plasma equilibrium state for the case $\alpha=0.4\mu$, and $\mu=5.3\ r_o^{-1}$. The magnetic axis occurs at $r_{ax}=0.613\ r_o$ and makes an angle of 52.4° to the guiding axis. The pitch is plotted in FIG. 5 as a function of $\bar{r}$, the average radius of a magnetic surface, $\bar{r}=(A/\pi)^{\frac{1}{2}}$, where A is the crosssectional sectional area in a plane perpendicular to the guiding axis enclosed by such magnetic surface. The pitch in FIG. 5 is the result of both plasma current and transform acting simultaneously, and the two effects cannot in general be separated. However, because $B_u=0$ at the edge ($r=r_o/\sqrt{2}$, the pitch there takes on the same value as Equation (5) and is due solely to transform. It is apparent from FIG. 5 that the magnitude of the transform is larger than the internal pitch at the magnetic axis generated by plasma currents. The magnetic shear $dP/d\bar{r}$ is also very large in the outermost third of the plasma. Representative helicoidal magnetic surfaces calculated for this same example are shown in FIG. 6.

In all the preceding examples the outermost plasma cross section has been defined by a half circle and a straight side bisected by the guiding axis. None of these particular features is necessary to the transform effect but instead resulted from the simplification of the mathematical analysis for the sake of the explanation. In particular, the convexly curved boundary need not be the arc of a circle, and the straight side can be moderately curved either convexly or concavely and can lie somewhat to either side of the guiding axis. The sharp corners are not necessary and can be rounded. The helicoid cross section does not need symmetry about either the magnetic or the guiding axis. The important features are the helical magnetic axis and the flattened side nearest the guiding axis.

Central to the concept of the invention is the controlled shaping of a z-pinch plasma into a helicoid of approximately D shaped cross section. The preferred embodiment described herein uses where possible techniques and apparatus that are common knowledge in the art of producing hot, magnetically confined plasmas.

Figure 7:
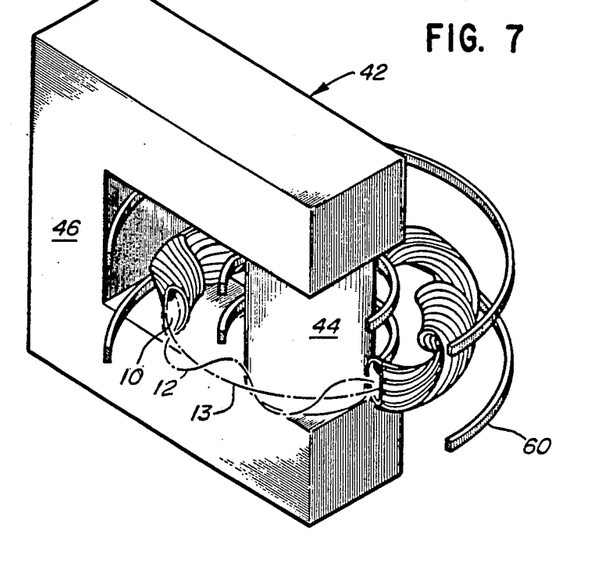
FIG. 7 is an isometric view of the general layout of a preferred embodiment of the present invention.
Figure 8:
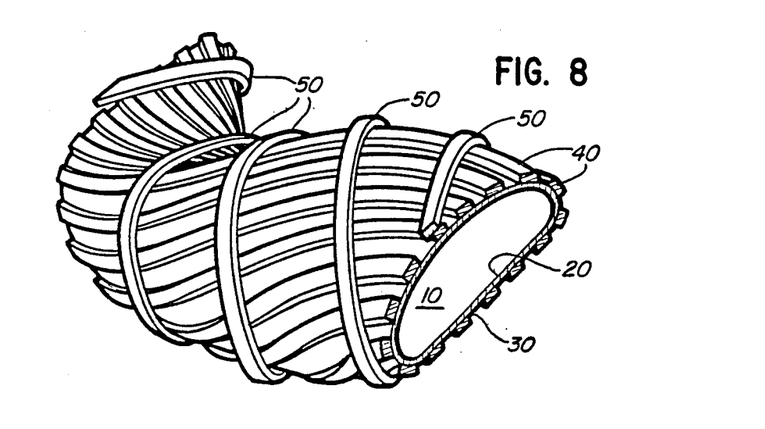
FIG. 8 is an enlarged and more detailed view of a portion of the confinement system shown in FIG. 7.
Figure 9:
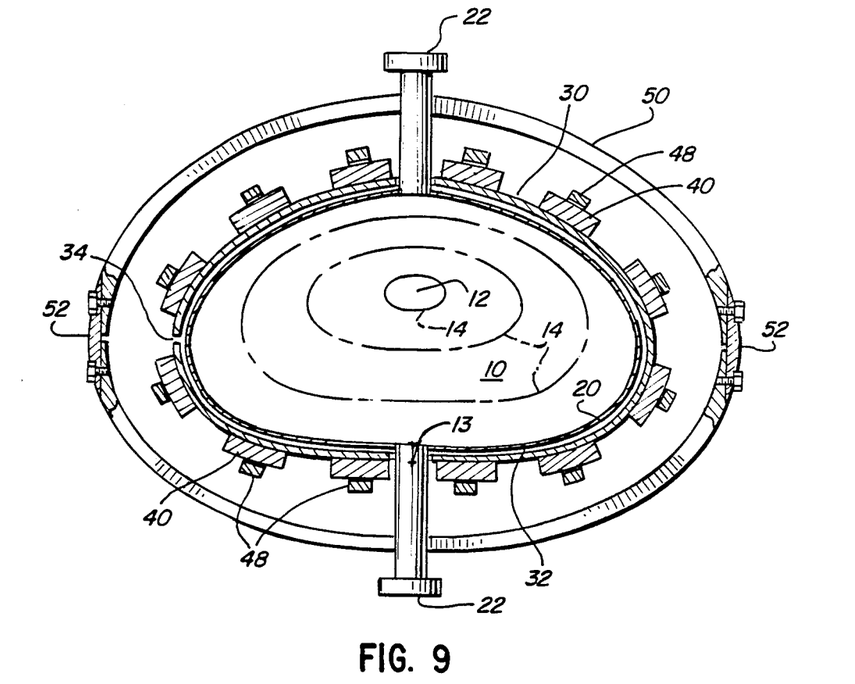
FIG. 9 is a sectional view taken perpendicular to the guiding axis of the apparatus illustrated in FIGS. 7 and 8.

A preferred embodiment of the invention as designed specifically for use as a plasma research device is illustrated in FIGS. 7, 8 and 9. As illustrated in these figures, a helicoidal plasma 10 with helicoidal magnetic surfaces 14 and a helical magnetic axis 12 helically disposed about a guiding axis 13 is created within a vacuum chamber formed by a wall 20. In the illustrated embodiment, the configuration is toroidal with the guiding axis 13 lying on the minor axis of the torus. The chamber wall 20 may be made of nonmagnetic stainless steel, such as 316 stainless steel, or of Inconel alloy, having a thickness of about 0.3 mm. Other materials having low electrical conductivity and compatible with high vacuum technique as practiced in fusion research devices may also be used. The axial resistance of the chamber wall should be greater than about 5 milliohms to permit penetration of induced axial electric field in much less than 1 ms to ionize hydrogen, deuterium, tritium or other gases injected into the chamber at a pressure of about 1 mtorr, and to drive axial plasma current. The inside of wall 20 may be cleaned in situ by a combination of d.c. glow discharge cleaning and baking to a temperature of about 100° C., or by other effective techniques practiced in the fusion art, to produce a clean surface with a low outgassing rate. As illustrated, the chamber is equipped with a plurality of ports 22 for various purposes, including viewing and making measurements of the plasma and evacuating the chamber to a base pressure of about $10^{-8}$ torr. Standard turbomolecular or cryopump vacuum pumping systems, not illustrated, may be used for the latter purpose.

Figure 10:
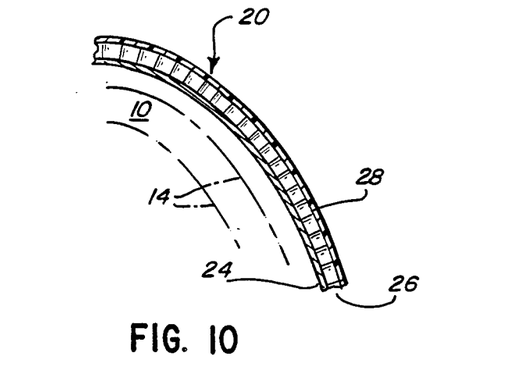
FIG. 10 is a cross-sectional view of a portion of the vacuum vessel shown in FIG. 9, illustrating a method of constructing the vacuum vessel, useful when its shape is too complicated to be built from commercially available metal bellows.

The chamber wall 20 is shaped so as to closely approximate the desired shape of the plasma. It happens that a chamber having a rounded-corner D cross section perpendicular to the guiding axis 13, as illustrated in FIG. 9, has an approximately circular cross section in a plane approximately perpendicular to the magnetic axis. Consequently, the chamber 20 can be conveniently fabricated conventionally by welding together short wedge-shaped lengths of standard metal bellows. If some different cross section is needed that cannot be assembled from standard shapes, then the chamber 20 can be fabricated as a laminate as shown in FIG. 10, consisting of a thin metal skin 24 facing the plasma 10 and satisfying the previously outlined criteria, bonded by high temperature epoxy adhesive to fiber-plastic hexagonal honeycomb 26 about 5 mm thick, which is similarly bonded to a fiber-plastic stiffener layer 28. The maximum wall temperature rise expected when 100 kJ of energy is deposited uniformly on the wall during a typical discharge is only 30° C.

The characteristic boundary shape, which determines the shape of the whole plasma through the laws of magnetohydrodynamics, is imparted by a shaped electrically conducting shell 30 by the principle of image current exclusion of magnetic flux penetration for times much shorter than L/R, where L and R are, respectively, the inductance and resistance of the shell. The shell 30 is also needed to complete the stabilization of the plasma as in prior art z-pinch and RFP devices. The shaped shell 30 is made of highly conducting metal, such as copper or aluminum, and it is 5 mm thick in the embodiment illustrated in FIGS. 7, 8 and 9. In a small plasma research device such as the one illustrated, clearance space 32 between the chamber wall 20 and the shell 30 is approximately 3 mm.

The major radius $R_m$ of the guiding axis 13 of the device illustrated is 0.7 m. The chamber 20 has a radius of 0.10 m in the plane in which it is approximately circular, which means that in the section shown in FIG. 9 the chamber cross section is 0.20 m high by about 0.30 m wide. The exact values of these dimensions may be changed as desired or required for improved plasma performance with no change in the nature of the invention. Chamber cross-sectional dimensions may be scaled to larger or smaller sizes, maintaining proportions close to those given here or choosing others for improved plasma performance. The major radius of the chamber may be increased or decreased independently of cross-sectional dimensions, because the plasma is insensitive to toroidal aspect ratio.

Helical induction windings 40 induce an electric field along the helical magnetic axis. This current ionizes gas within the chamber 20, thereby making plasma, and drives sufficient axial current through the plasma in the direction of the helical axis to heat it resistively to high temperature. The poloidal magnetic field created by the axial current also contributes the majority of the magnetic confinement of the hot plasma 10 through the pinch effect, and, therefore, such current must be sustained for the desired duration of plasma confinement. The induction windings 40 form the primary winding of a transformer of which the plasma 10 and, to a negligible extent, the chamber wall 20 forms the secondary. The shell 30 includes an electrically nonconductive break 34 to prohibit the flow of net toroidal current in the shell, which would otherwise act as a short-circuited secondary circuit for the induction windings 40. The break should be insulated to 10 kV to withstand transient voltages. These aspects of the device and the basic design considerations thereof are the same in the present invention as in RFP, tokamak and other ohmically heated toroidal plasma devices.

An iron core 42, consisting of a round central piece 44 and three return yoke pieces 46 of arbitrary cross section, is used to improve the transformer coupling between the induction windings 40 and the plasma secondary. The radius of the central piece 44 illustrated is 0.3 m. When constructed of conventional, grain-oriented silicon transformer steel, the flux swing possible in the core is greater than 0.85 Wb, whereas RFP experience teaches that only about 0.4 Wb are necessary to form a 150 kA helical D pinch plasma of this size. The remaining 0.45 Wb of flux can be used to sustain the plasma current once established, until the flux is consumed by plasma resistance. The core 42 can be supported and aligned in a conventional manner.

The induction windings 40 are energized in a conventional manner. For example, if the windings are made with 12 toroidal turns, as illustrated in FIG. 9, a capacitor bank charged to 10 kV will induce an electric field of 130 V/m in the toroidal direction. Such an electric field has been found to be adequate to establish hot plasmas in RFP experiments of similar size.

When the iron core 42 is included, the total induction winding current and plasma toroidal current maintain almost perfect proportionality as determined by the number of induction winding turns. Under these conditions the induction windings 40 can also conveniently serve a second purpose, namely, to reduce to a low level the image currents in the shell 30 shaping the plasma by running the windings 40 in only the û, or helically symmetric, direction, with an appropriate distribution around the minor circumference (as can be determined experimentally or readily calculated with the aid of MHD computer programs). Minimization of shell currents is part of good contemporary RFP device practice. It reduces magnetic field errors that inevitably arise where the image currents in the shell are disturbed by the insulated break, by cutouts to pass the access ports 22 and by inevitable imperfections at joints between component pieces of the shell. It also makes the plasma shaping independent of time-decaying image currents in the shell.

Vernier shaping windings 48 are optionally included in the device to provide a more flexible degree of control over the shape and position of the plasma and to adjust for changes in the pressure of the confined plasma and its internal current distribution. (The windings 48 are shown in the detailed FIG. 9, but for clarity, and because they are optional anyway, they are not shown in the less detailed FIGS. 7 and 8. The principle is similar to that used to control the shape of tokamak plasmas. The vernier coils are energized independently of other windings, for example, by means of a thyristor chopper power supply. The respective vernier windings can be made to perform their functions in respective negative feedback loops by the addition of magnetic field pickups around the periphery of the plasma to sense its state and react through suitable amplifiers to control the application of current to the respective vernier windings.

The tendency of all toroidal plasmas to expand in major toroidal radius must be counteracted to have a complete equilibrium. This is achieved to a first approximation by the aforementioned distribution of the induction windings 40. Adjustment for variations of the pressure and internal current distribution of the plasma can be effected by driving current through vertical field vernier windings 60 of conventional design. These windings can also be made to perform their function in a negative feedback loop by the addition of magnetic field pickups around the periphery of the plasma to sense plasma position and react through suitable amplifiers driving a thyristor chopper or other power supply energizing the windings 60.

A plurality of axial field coils 50, analogous to the toroidal field coils of RFP devices, are disposed about the plasma 10, the chamber wall 20, the shell 30, induction windings 40 and the vernier shaping windings 48, in order to produce the axial magnetic field required for stable pinch operation. (The field coils 50 are shown in FIGS. 8 and 9, but for clarity of the showing of the disposition of the induction windings 40, the coils 50 are omitted from the less detailed FIG. 7. As with all pinches, the axial field intensity is proportional to the plasma current and is relatively small compared to tokamaks. In the embodiment illustrated, if the plasma carries 150 kA of toroidal current, then the axial field coils need supply only about 0.25T. Thus, the coils 50 are not subject to large forces.

The preferred design facilitates disassembly for easy access to the induction windings, shell and chamber. The design illustrated employs copper conductors of rectangular cross section. Each turn is split into two halves with bolted joints 52 for ease of disassembly. Series connections between adjacent turns are made by any of the standard means that keep magnetic field errors small. Each turn lies approximately in a plane locally perpendicular to the plasma magnetic axis. However, the turns themselves need not be plane figures but may be bent out of plane, as determined by coil design procedures to generate an axial magnetic field that is everywhere tangent to the surface of the shell 30. The number of turns is made sufficient so that ripple in the axial field strength from the discreteness of the coil conductors is not a problem, for example, 100 turns. An axial field of 0.25 T in the embodiment shown requires an axial field ampere-turn product of about $1.25 \times 10^6$. The time dependence of this current is similar to that of similar sized RFP devices with toroidal field programming and is similarly most conveniently supplied by a capacitor bank. In order to permit programming of the axial magnetic field, both during the plasma formation phase, which typically lasts for 0.2 ms to 1 ms, and during the plasma sustainment phase, which may last about 5 ms in the embodiment shown, and to further reduce image currents in the shell 30 and the resultant magnetic field errors, the shell 30 contains at least one insulated axial break 34 extending completely around the torus in the û, or helically symmetric, direction.

The present invention therefore provides a method and apparatus for making magnetically confined toroidal plasmas of the reversed field pinch variety with a large translational transform. Such large translational transform has not been possible in prior art z-pinch configurations. The present invention closely approximates an ideally stable Taylor pinch state. The magnitude and distribution of translational transform according to the present invention is such as to greatly aid the reversal of magnetic field line pitch, increase magnetic shear, increase plasma stability and reduce the work done by the plasma dynamo. Therefore, advantages of greater stability and improved plasma confinement may be achieved compared with prior art z-pinch devices.

While the novel aspects of a magnetic confinement plasma device in accordance with the present invention have been shown in a preferred embodiment, many modifications and variations may be made therein within the scope of the invention, as in the size, shape, and current and field intensities, as well as in application of alternate methods and techniques well known in the art of plasma and fusion. For example, the induction windings 40 may be designed to operate without an iron core 42, and the plasma shaping may be done entirely by a separate coil designed solely for that purpose. The device may also include various well-known appurtenances of plasma and fusion devices such as power supplies, vacuum pumps, instrumentation, blankets, heat exchangers, supporting structures and control systems. The particular embodiment described is designed primarily for experimental and research purposes. Scaled-up embodiments intended for the production of fusion and power will likely require these and other appurtenances.

What is claimed is:

1. A method for generating and magnetically confining plasma in a pinch with translational transform comprising:

generating plasma, shaping and positioning said plasma into a helicoid of substantially D-shape in cross sections perpendicular to a guiding axis with the relatively flat portion of the D-shape nearest said guiding axis and the relatively convex portion of the D-shape farther from said guiding axis with the plasma wound substantially helically about said guiding axis, passing current through said plasma to form a reverse field pinch with a respective set of nested closed magnetic surfaces enclosing and defining a magnetic axis substantially helically wound about said guiding axis, and applying a magnetic field through said plasma in the direction of said magnetic axis.

* * * * *

UNITED STATES PATENT AND TRADEMARK OFFICE
CERTIFICATE OF CORRECTION

PATENT NO. : 4,734,247

DATED : March 29, 1988

INVENTOR(S) : Michael J. Schaffer

It is certified that error appears in the above-identified patent and that said Letters Patent is hereby corrected as shown below:

On Abstract page, under "OTHER PUBLICATIONS", change "Furth;" to --Furth,-- and after "Taylor," delete "H.P.,".

Column 4, line 56, change "$|q|=1$" to --$|q|\geq 1$--.

Column 5, line 66, change "B" to --$\vec{B}$--.

Column 6, line 43, after "a and b" insert a comma.

Column 6, line 50, after "$(r_o)$" insert a period.

Column 7, line 30, change "$\frac{ff}{h^2}$" to --$\frac{ff'}{h^2}$--.

Column 7, line 48, change "p'hu" to --p'hû--.

Column 7, line 58, change "$\mu j_m$" to --$\mu J_m$--.

Column 7, line 63, change "<" to -->--.

Column 8, line 9, change "crosssectional sectional" to --cross-sectional--.

UNITED STATES PATENT AND TRADEMARK OFFICE
CERTIFICATE OF CORRECTION

PATENT NO. : 4,734,247

DATED : March 29, 1988

INVENTOR(S) : Michael J. Schaffer

It is certified that error appears in the above-identified patent and that said Letters Patent is hereby corrected as shown below:

Column 10, line 60, after "8." insert --)--.

Column 11, line 25, after "7." insert --)--.

Signed and Sealed this

Fifteenth Day of November, 1988

Attest:

*Attesting Officer*

DONALD J. QUIGG

Commissioner of Patents and Trademarks